US009727521B2

United States Patent
Ma et al.

(10) Patent No.: US 9,727,521 B2
(45) Date of Patent: *Aug. 8, 2017

(54) EFFICIENT CPU MAILBOX READ ACCESS TO GPU MEMORY

(75) Inventors: Dennis K. Ma, Austin, TX (US); Karan Gupta, Uttar Pradesh (IN); Lei Tian, Boxborough, MA (US); Franck R. Diard, Saint-Contest (FR); Praveen Jain, Santa Clara, CA (US); Wei-Je Huang, Fremont, CA (US); Atul Kalambur, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 13/620,232

(22) Filed: Sep. 14, 2012

(65) Prior Publication Data

US 2014/0082120 A1 Mar. 20, 2014

(51) Int. Cl.
| | |
|---|---|
| *G06F 15/167* | (2006.01) |
| *G06F 15/16* | (2006.01) |
| *G06F 15/163* | (2006.01) |
| *G06F 15/173* | (2006.01) |
| *G06F 15/17* | (2006.01) |

(52) U.S. Cl.
CPC .......... *G06F 15/167* (2013.01); *G06F 15/16* (2013.01); *G06F 15/163* (2013.01); *G06F 15/17* (2013.01); *G06F 15/173* (2013.01)

(58) Field of Classification Search
CPC ...... G06F 15/17; G06F 15/163; G06F 15/167; G06F 15/16; G06F 15/173
See application file for complete search history.

(56) References Cited

U.S. PATENT DOCUMENTS

| | | | | |
|---|---|---|---|---|
| 6,622,191 | B1 * | 9/2003 | Nakamura ................. | 710/260 |
| 7,469,309 | B1 * | 12/2008 | Duncan et al. ............. | 710/240 |
| 2003/0172149 | A1 * | 9/2003 | Edsall .................. | G06F 3/0605 |
| | | | | 709/224 |
| 2005/0257264 | A1 * | 11/2005 | Stolfo et al. ................. | 726/23 |
| 2009/0119464 | A1 * | 5/2009 | Grundy et al. .............. | 711/154 |
| 2011/0075473 | A1 * | 3/2011 | Park et al. ................... | 365/163 |
| 2012/0017014 | A1 * | 1/2012 | Shuholm et al. ............. | 710/65 |
| 2012/0246332 | A1 * | 9/2012 | Lee et al. ................... | 709/231 |

* cited by examiner

*Primary Examiner* — Henry Tsai
*Assistant Examiner* — John Roche
(74) *Attorney, Agent, or Firm* — Artegis Law Group, LLP (57) ABSTRACT

Techniques are disclosed for peer-to-peer data transfers where a source device receives a request to read data words from a target device. The source device creates a first and second read command for reading a first portion and a second portion of a plurality of data words from the target device, respectively. The source device transmits the first read command to the target device, and, before a first read operation associated with the first read command is complete, transmits the second read command to the target device. The first and second portions of the plurality of data words are stored in a first and second portion a buffer memory, respectively. Advantageously, an arbitrary number of multiple read operations may be in progress at a given time without using multiple peer-to-peer memory buffers. Performance for large data block transfers is improved without consuming peer-to-peer memory buffers needed by other peer GPUs.

21 Claims, 6 Drawing Sheets

EFFICIENT CPU MAILBOX READ ACCESS TO GPU MEMORY

BACKGROUND OF THE INVENTION

Field of the Invention

The present invention generally relates to data transfer within a computing environment and, more particularly, to efficient central processing unit (CPU) mailbox read access to graphics processing unit (GPU) memory.

Description of the Related Art

In modern computing environments, a multitude of devices are generally interconnected to provide processing speed and flexibility within the computing environment. To create such a computing environment, various devices are connected to one another via an interconnectivity fabric such as a network or bus structure. The devices connected to the interconnectivity fabric generally include local memory that is used by a device during a computation.

One example of such a computing environment is used for graphics processing, where a central processing unit (CPU) and a plurality of graphics processing units (GPUs) are connected to one another by an interconnectivity fabric, and each GPU is coupled to a frame buffer (i.e., local memory). The frame buffer stores graphics data being processed by the individual GPUs. Generally, large amounts of data need to be processed by the GPUs to render textures and create other graphics information for display. To achieve rapid processing, the processing task is divided amongst GPUs such that components of the task are performed in parallel.

A first GPU may access frame buffer memory associated with a second peer GPU by directly reading the frame buffer memory via a peer-to-peer interface that uses a memory aperture. In such cases, the first GPU sends a message to the second GPU requesting a block of data. The second GPU retrieves the requested data, places the data into the memory aperture, and sends a message to the first GPU indicating that the requested data is now available in the memory aperture. Such a messaging system among peer GPUs is called a peer-to-peer mailbox protocol. At times, in such a computing environment, the CPU may need to read a block of data stored in the frame buffer of one the GPUs, where the block of data is larger than the size of the peer-to-peer aperture used to effect the transfer. Consequently, two or more data transfers are needed to transfer the entire data block from the frame buffer on the GPU to a memory associated with the CPU. Presently, some data transfer protocols provide a mechanism to divide the data block transfer into multiple peer-to-peer operations where each operation transfers a portion of the data block, and where the portion transferred during a particular operation is no larger than the memory buffer. The transfer of the data block from the GPU to the CPU completes when all of the multiple operations are complete.

One problem with the above approach is that a given operation may not complete until all of the earlier operations complete. Transfers of data blocks that are large relative to the size of the peer-to-peer memory buffer may experience a low data transfer rate because the transfer of the data block is funneled through a relative small data path. Alternatively, multiple peer-to-peer memory buffers may be used to transfer the data block, such that more than one peer-to-peer operations related to the data block transfer may be simultaneously in progress. However, the data block transfer may still be large relative to the total available space available to the multiple peer-to-peer memory buffers. Further, the number of peer-to-peer memory buffers may be limited, such that if a first GPU utilizes multiple peer-to-peer memory buffers, other peer GPUs may not have access to any peer-to-peer memory buffer, and thus may not be able to complete any data transfer operations until the first GPU completes the large data block transfer. Finally, a direct-memory-access (DMA) operation may be used to transfer large data blocks. However, although DMA transfers may have a higher data rate than transfers via one or more peer-to-peer operations through a memory buffer, DMA transfers are typically cumbersome to initiate and may be associated with a long latency, making DMA transfers inappropriate for urgent memory transfers.

As the foregoing illustrates, what is needed in the art is an improved technique for reading data in peer-to-peer data transfers within a computing environment.

SUMMARY OF THE INVENTION

One embodiment of the present invention sets forth a method for performing peer-to-peer data read transfers. The method includes receiving a request to read a plurality of data words from a target device. The method further includes creating a first read command for reading a first portion of the plurality of data words from the target device, and creating a second read command for reading a second portion of the plurality of data words from the target device. The method further includes transmitting the first read command to the target device, and before a first read operation associated with the first read command is complete, transmitting the second read command to the target device. The first portion of the plurality of data words accessed via the first read operation is stored in a first portion of a buffer memory, and the second portion of the plurality of data words accessed via the second read operation is stored in a second portion of the buffer memory.

Other embodiments include, without limitation, a subsystem that includes a first device configured to implement one or more aspects of the disclosed methods as well as a system configured to implement one or more aspects of the disclosed methods.

One advantage of the disclosed technique is that an arbitrary number of multiple read operations may be in progress at a given time without using multiple peer-to-peer memory buffers. Performance for large data block transfers is improved without consuming peer-to-peer memory buffers needed by other peer GPUs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
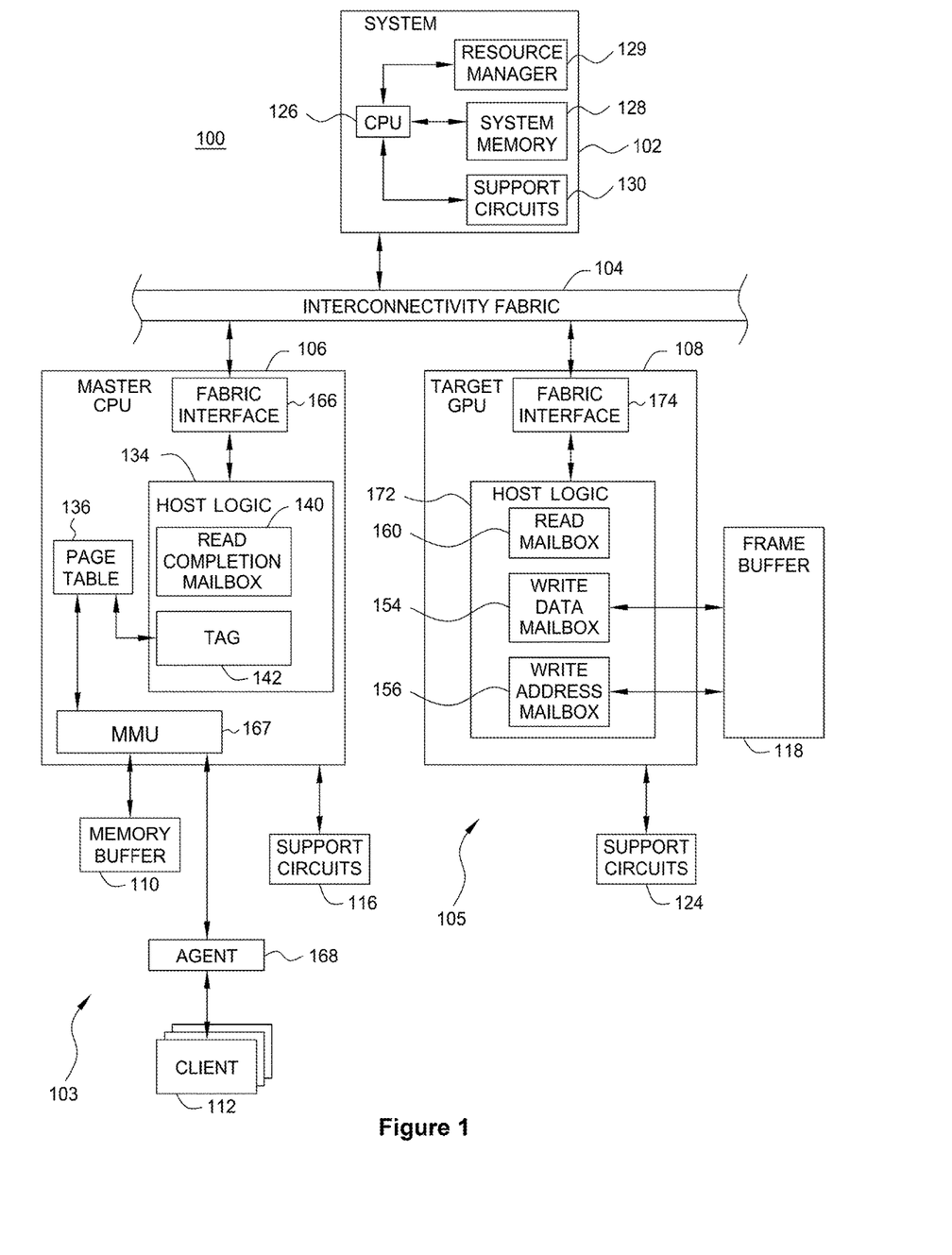
FIG. 1 illustrates a computing environment configured to implement one or more aspects of the present invention.

FIG. 1 illustrates a computing environment configured to implement one or more aspects of the present invention. As shown, the computing environment 100 includes a system level computer 102, an interconnectivity fabric 104 and a plurality of peer devices 103 and 105. The peer devices 103 and 105, although they may be any form of computing device including computer systems, network appliances, storage devices, integrated circuits, central processing units (CPUs), microcontrollers, and the like, in the embodiment depicted in FIG. 1 the peer devices 103 and 105 comprise graphics processing units (GPUs) 106 and 108. Although two devices 103 and 105 are depicted, those skilled in the art will understand that the invention is applicable to any number of peer devices. As described below, the invention provides a method and apparatus that facilitates data transfer between the peer devices 103 and 105.

The system computer 102 is a general processing computer system that includes a central processing unit (CPU) 126, system memory 128, a resource manager 129, and support circuits 130. In one embodiment of the invention, this system computer includes the "motherboard" of a computer or server. The system computer 102 uses the peer devices 103 and 105 to provide specific types of computing (such as graphics processing). The CPU 126 may be one of any form of general purpose microprocessor or microcontroller. System memory 128 comprises random access memory, read only memory, removable storage, disk drive storage, or any combination of memory devices. The resource manager 129 allocates address space to devices, such as peer devices 103 and 105 within computing environment 100 and generates a memory map for the system memory 128. The support circuits 130 are well known circuits used to facilitate functionality of the computer system 102 including clock circuits, cache, power supplies, interface circuitry and the like.

The interconnectivity fabric 104 (hereinafter simply referred to as the "fabric") comprises one of many forms of structures that enable data to be transferred from one peer device to another peer device or from one peer device to system memory. Such fabric includes an advance switching network or a bridge device supporting accelerated graphics port (AGP), peripheral controller interface (PCI) bus, or PCI-Express™ (PCIe) bus protocols or any other form of structure interconnectivity that may be used to interconnect peer devices 103 and 105. An example of interconnectivity fabric 104 known in the art is the Intel® Northbridge. In at least one embodiment, the peer devices 103 and 105 are included within a system on a chip (SoC), where the peer devices 103 and 105 communicate through a fabric configured to support such an SoC implementation, including, without limitation, advanced microcontroller bus architecture (AMBA).

Although, in FIG. 1, peer device 103 differs from peer device 105, in some embodiments of the present invention, the logic and software of each peer device 103 and 105 may be identical. In one embodiment, the peer device 103 may include a master CPU 106 coupled to a memory buffer 110, agent 168, and support circuits 116. As shown, the master CPU 106 includes a MMU (memory management unit) 167, fabric interface 166, page table 136, and host logic 134. The fabric interface 166 couples host logic 134 to the fabric 104. The host logic 134 includes a read completion mailbox 140 and a tag 142. The memory buffer 110 is typically some form of random access memory having a very large capacity. In some embodiments, the memory buffer 110 includes a circular read buffer associated with a plurality of read buffers configured to receive payload data returned from the peer device 105, as further described below. The memory management unit 167 couples the memory buffer 110 and an agent 168 to other units within master CPU 106. The agent 168 interfaces between the master CPU 106 and one or more clients 112 (such as, processes or hardware within the computing environment). The support circuits 116 include well known circuits that facilitate the functionality of the master CPU 106 including, without limitation, clock circuits, interface hardware, and power supplies.

In one embodiment, the peer device 105 may include a target GPU 108 coupled to a frame buffer 118 and support circuits 124. The frame buffer 118 is typically some form of random access memory having a very large capacity, for example, on the order of two or more gigabytes. Within the target GPU 108 is a fabric interface 174 and host logic 172. The fabric interface 174 couples host logic 172 to the fabric 104. The host logic 172 includes a read mailbox 160, a write data mailbox 154, and a write address mailbox 156. The support circuits 124 include well known circuits that facilitate the functionality of the target GPU 108 including, without limitation, clock circuits, interface hardware, power supplies.

In operation, a data transfer process begins with one of the clients 112 requesting access to data within a memory buffer 110 or frame buffer 118. The client 112 communicates to the agent 168 that is executing on the master CPU 106. The agent 168 communicates with the memory management unit 167, which determines if the request needs access to a local frame buffer, such as memory buffer 110, or if the request needs access to a peer frame buffer, such as frame buffer 118.

In a computer environment that allows the client 112 to access data within a peer frame buffer 118 in accordance with the present invention, the page table 136 is adapted to indicate which physical memory address in the peer frame buffer 118 is accessed for a particular virtual address corresponding to the read or write request from the client 112. The page table 136 is generated by the resource manager 129 during initialization to reflect the memory mapping, including, without limitation, local, system, and peer memory mapping. An attribute field (not shown) within the page table 136 identifies whether the data is associated with a local memory buffer 110, associated with the system memory 128, associated with a peer frame buffer 118, or not associated with a memory. As previously described above, the memory management unit 167 uses the page table 136 to determine if the read or write address for the data associated with the read or write request from the client 112 is within the peer frame buffer 118.

More specifically, information for identifying and decoding information in a local or remote frame buffer is stored in entries in the page table 136 used by the requesting peer device 103. The page table entries are maintained by resource management software and interpreted by the memory management unit 167. The physical address and data type of each page referenced in a request from the client 112 are stored by the resource manager 129 in the page table 136. This information is needed by the target peer device 105 to provide the necessary data to the requesting peer device 103. For purposes of this description, "data type" includes, without limitation, endian ordering, compression format, data structure organization, information related to how the data is specified, any information related to how the data is referenced or translated when fetched from or stored in local, system or peer address space, and any combination thereof.

Figure 2:
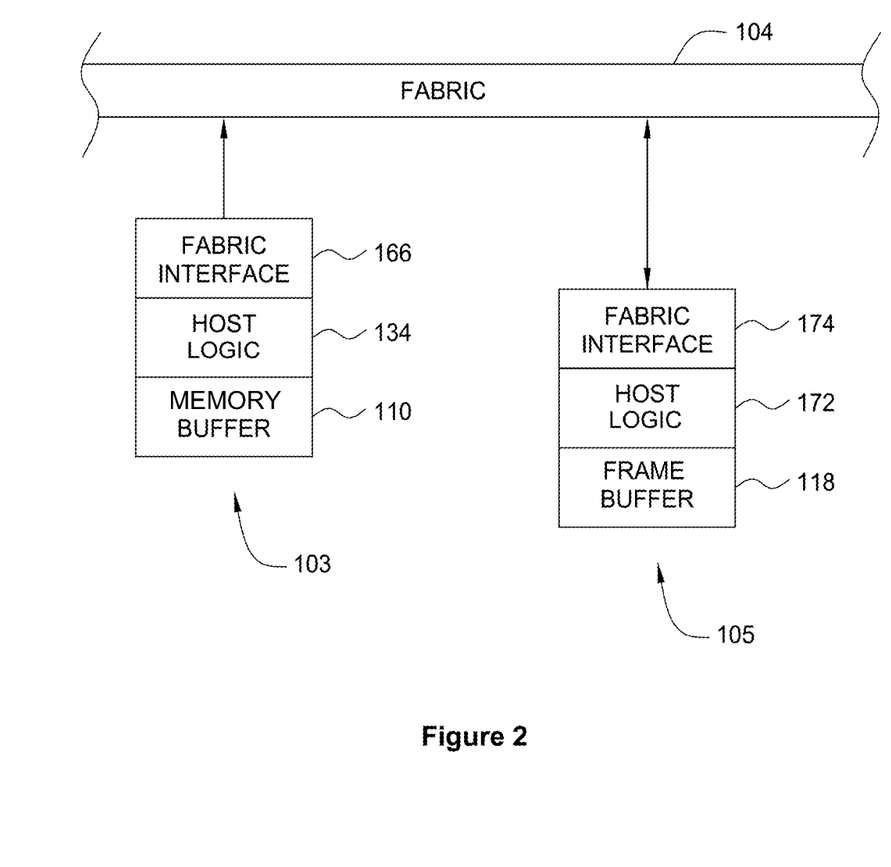
FIG. 2 depicts a functional block diagram of the computing environment of FIG. 1.

FIG. 2 depicts a functional block diagram of the computing environment of FIG. 1. Specifically, FIG. 2 depicts interconnectivity of the peer devices 103 and 105. This interconnectivity enables the peer device 103 to access (read or write) the frame buffer 118 of the peer device 105 without modification to the fabric 104 or the fabric interfaces 166, 174. As such, the fabric interfaces 166 and 174 as well as the fabric itself 104 can be any standard interconnectivity fabric and related interfaces that provide communication functionality between the peer devices 103, 105. In achieving access to the frame buffer 118 of peer device 105, the host logic 134 provides the functionality that facilitates access to the peer frame buffer 118 without alteration of the fabric interfaces 166, 174. Consequently, when a request from the client 112 of FIG. 1 for data within the peer frame buffer 118 is received by the peer device 103, the host logic 134 performs a translation of the data request into a protocol that is supported by the fabric interface 166. The fabric interface 166 transfers the request through the fabric 104 to the fabric interface 174 of the peer device 105. The host logic 172 provides functionality to access the frame buffer 118 within the remote peer device 105.

For example, if the client 112 coupled to the peer device 103 requests data from the frame buffer 118 within the peer device 105, then the host logic 134 translates that request into a form that is understandable and is readily utilized by the fabric interface 166, the fabric 104, and the fabric interface 174. As such, the request is passed from the peer device 103 to the peer device 105 and processed by the host logic 172 within the peer device 105. The host logic 172 provides access to the frame buffer 118 such that the data is either read or written, depending on the request, within the peer device 105. If the request is a read request, then the data from the frame buffer 118 is sent from the host logic 172 in such a manner that the fabric interface 174, the fabric 104 and the fabric interface 166 accept and communicate the data to the peer device 103, wherein the host logic 134 processes the data. In this manner, peer devices 103 and 105 can perform peer-to-peer data transfers without any modification to the fabric interfaces 166, 174 or the fabric 104. Consequently, peer devices that include the present invention communicate within the computing environment 100 in a standard manner using standard communication protocols.

In one specific embodiment, the peer device 103 may include a CPU (not shown) that initiates a memory access request via the fabric 104, where the memory access request directed to the frame buffer 118 associated with peer device 105. The memory access request may include one or more memory read requests configured to transfer a block of data from the frame buffer 118 associated with peer device 105, where the block of data is large relative to the size of the payload capacity of the read completion buffer 140. In such a case, performance of the data block transfer may be enhanced where each read request includes a target address where the payload data may be stored. The target address may be associated with a memory that is accessible to peer device 103. Such a read request is described below.

Figure 3:
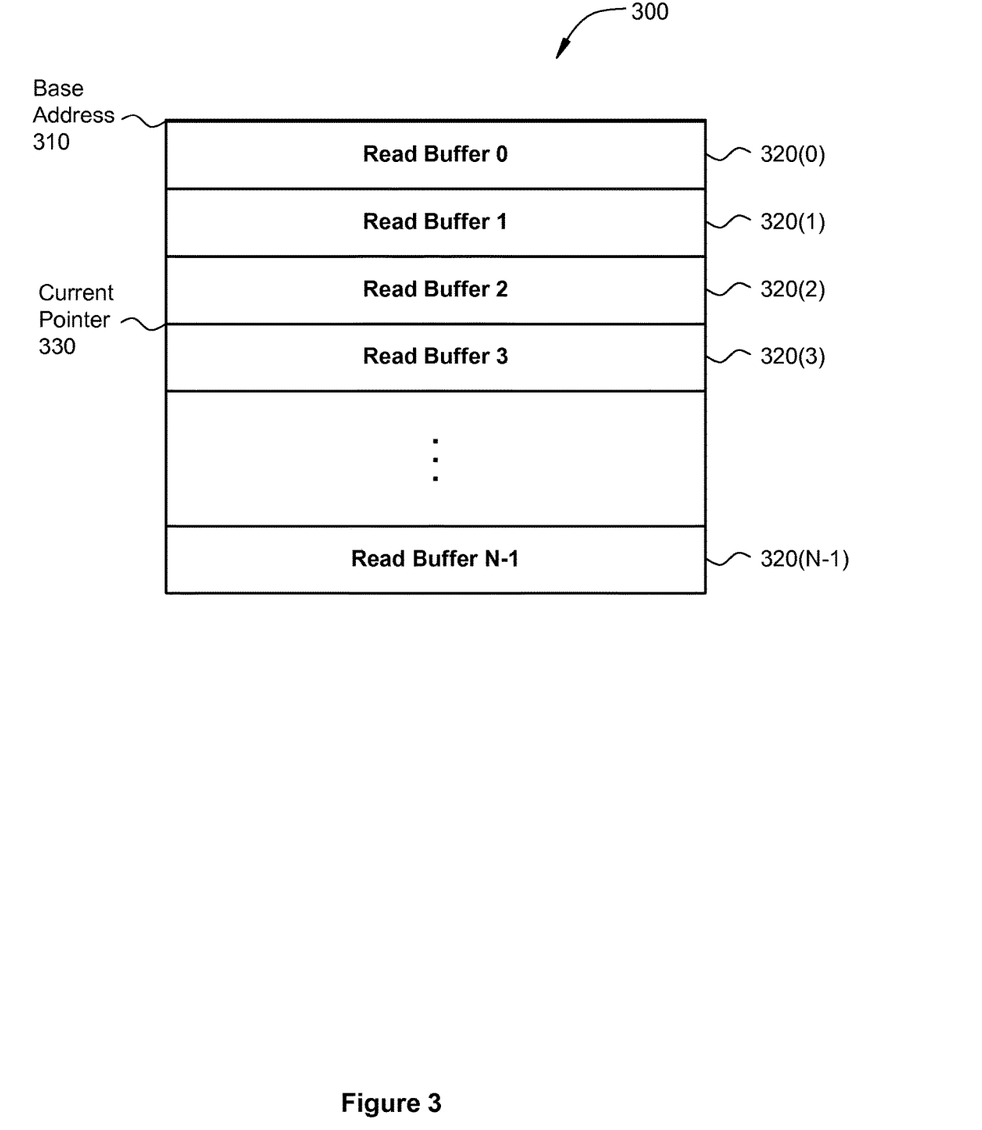
FIG. 3 depicts a circular read buffer configured to receive data from one or more read request messages, according to one embodiment of the present invention.

FIG. 3 depicts a circular read buffer 300 configured to receive payload data from one or more read request messages, according to one embodiment of the present invention. As shown, the circular read buffer 300 includes a base address 310, read buffers 320, and a current pointer 330.

The base address 310 is the beginning address of the circular read buffer 300 where the payload data associated with memory read requests is written. The base address 310 points to the first read buffer 320 where payload data is written in response to a memory read request.

The read buffers 320 are blocks of memory within the circular read buffer 300 where payload data is written in response to a memory read request. As shown, the circular read buffer 300 includes N read buffers 320(0)-320(N−1). When the peer device 103 seeks to transfer a block of data from memory buffer 110 to the circular buffer 300, the peer device 103 may divide the transfer into multiple read requests, where the multiple read requests are configured to deliver payload data to a contiguous group of read buffers 320.

In one example, the peer device 103 could seek to transfer a block of data from frame buffer 118, where the block of data is three times the size of the payload data associated with one memory read request. In such a case, the peer device 103 would transmit three memory read requests to the peer device 105. The first memory read request would be configured to deliver payload data to read buffer 320(0), the second memory read request would be configured to deliver payload data to read buffer 320(1), and the third memory read request would be configured to deliver payload data to read buffer 320(2). Because the three memory read requests are configured to deliver payload data to a different read buffer 320 in the circular buffer 300 rather than to the single payload data area of the read completion mailbox 140, all three memory read requests may progress simultaneously without worry about conflicts. In short, because the three memory read requests write to different areas within memory, the payload data from one of the memory read requests does not overwrite the payload data from any of the other memory read requests. In addition, in various embodiments, the three memory read requests may complete in any order, and need not be processed in consecutive order.

The current pointer 330 is the address of the read buffer 320 within the circular read buffer 300 that is configured to receive the payload data associated with the next memory read request issued by the peer device 103. Continuing with the example described above, the peer device 103 could seek to transfer a block of data from frame buffer 118, where the block of data is three times the size of the payload data associated with one memory read request. Initially, the current pointer 330 could be initialized to the base address 310 and could point to read buffer 320(0). The peer device 103 would send a first memory read request to the peer device 105, directing the peer device 105 to deliver the payload data to the address pointed to by the current pointer 330, namely, read buffer 320(0).

The peer device 103 would then update the current pointer to point to read buffer 320(1). The peer device would send a second memory read request to the peer device 105, directing the peer device 105 to deliver the payload data to the address pointed to by the current pointer 330, namely, read buffer 320(1). The peer device 103 would then update the current pointer to point to read buffer 320(2). The peer device 103 would send a third memory read request to the peer device 105, directing the peer device 105 to deliver the payload data to the address pointed to by the current pointer 330, namely, read buffer 320(2). The peer device 103 would then update the current pointer to point to read buffer 320(3), as shown. The peer device 105 could complete the three memory read requests, in any order, and deliver the associated payload data to read buffers (0)-(2). Read buffers (0)-(2) would then include the entire block of data requested by the peer device 103. A following memory read request from the peer device 103 would direct the peer device to deliver the associated payload data to the next available read buffer 320 as pointed to by the current pointer 330, namely read buffer 320(3), as shown.

In one embodiment, additional processing may take place when a memory read request configured to deliver payload data to the last read buffer 320(N−1) is issued by the peer device 103. In such a case, updating the current pointer 330, may result in the current pointer 330 addressing a location in memory that is beyond the range of the circular buffer 300. In one example, the peer device 103 could detect such a condition via any technically feasible means, including, without limitation, issuing an interrupt or trap when the current pointer 330 is outside the range of the circular buffer 300, or by comparing the current pointer 330 to the address range of the circular buffer 300 after each update of the current pointer 300. The peer device 103 could then initialize the current pointer 330 to the value of the base address 310. The current pointer 330 would then point to the first read buffer 320 in the circular read buffer 300, namely read buffer 320(0).

In another example, the circular buffer 300 could be associated with a hardware device (not shown) that includes a first register for the base address 310 and a second register for an index value (not shown). In such a case, the hardware device would calculate the current pointer 330 by adding the base pointer 310 to the index value. After each memory read request is transmitted, the index value would be updated to index the next read buffer 320 in the circular buffer 300. Once the hardware device would detect that the index value points beyond address range of the circular buffer 300, the hardware device would then reset the index value to zero. The base address plus the reset index value would then point to the first read buffer 320 in the circular buffer 300, namely read buffer 320(0).

Figure 4:
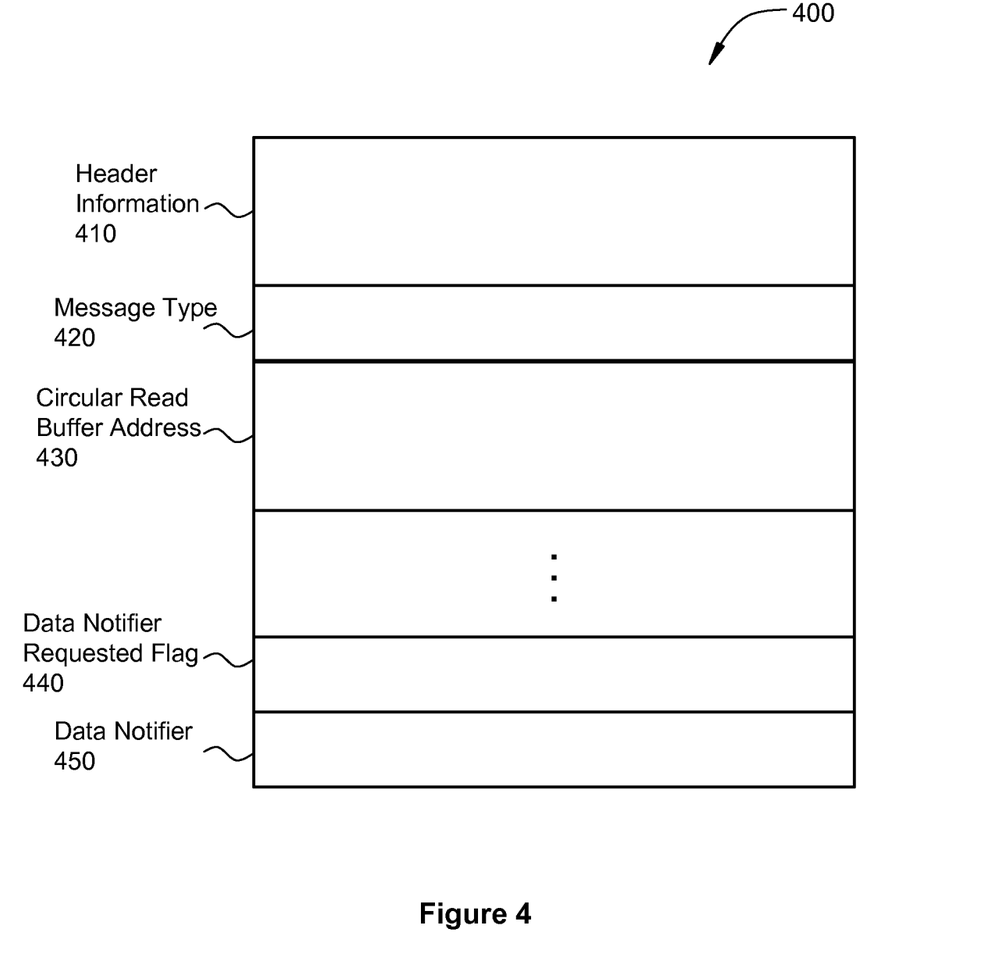
FIG. 4 depicts a memory read request message, according to one embodiment of the present invention.

FIG. 4 depicts a memory read request message 400, according to one embodiment of the present invention. As shown, the read request message 400 includes header information 410, a message type 420, a circular read buffer address 430, a data notifier requested flag 440 and a data notifier value 450.

The header information 410 includes various parameters related to the memory read request message. These parameters may include, without limitation, the length of the memory read request message, the address in frame buffer 118 on the peer device 105 where the requested data is located, and an identifier associated with the peer device 103. In general, header information ensures proper transmission of the memory read request message at the peer device 105 and includes information needed by the peer device 105 to complete the request. Typically, the definition and order of the various parameters are defined by the protocol associated with the fabric 104.

The message type 420 includes a parameter identifying the message as a memory read request directing the peer device 105 to write the corresponding payload data to a specific location in the circular buffer 300. In some embodiments, the message type 420 may identify the message as a different type, including, without limitation, a request for status information, a memory write request, or a memory read request directing payload data to be delivered to the read completion mailbox 140.

The circular read buffer address 430 is the address in the circular read buffer 300 where the peer device 105 is directed to write the payload data. The circular read buffer address 430 is needed by the peer device 105 to ensure that the payload data transmitted in an associated message is stored in the correct locations in the circular read buffer 300. Typically, the peer device 103 sets the circular read buffer address 430 for a group of memory read requests to point to a set of contiguous read buffers 320 in the circular read buffer 300.

The data notifier requested flag 440 indicates whether the memory read request includes a data notifier value 450, as further described below. If the data notifier flag indicates that the memory read request includes a data notifier value 450, then the peer device 105 performs an additional step after writing the payload data to the designated read buffer 320 in the circular read buffer 300. After writing the payload data associated with the memory read request, the peer device 105 writes the value given by the data notifier value 450 into a memory location accessible by the peer device 103 where the current data notifier is stored. In one embodiment, the peer device 103 periodically reads the memory location where the current data notifier is stored. If the current data notifier is set to a value associated with the data notifier value 450 of a specific memory read request message 400, then the peer device knows that the corresponding memory read request completed. If the data notifier flag indicates that the memory read request does not include a data notifier value 450, then the peer device 105 does not perform the additional step after writing the payload data to the designated read buffer 320 in the circular read buffer 300. The current data notifier remains at the current value.

The data notifier value 450 includes the value to be written to the memory location where the current data notifier is stored, if the data notifier requested flag 440 indicates that the memory read request includes a data notifier value 450. In one example, the peer device 103 could initiate a data block transfer including fifty memory read requests, and could include a data notifier value with every tenth memory read request message 400. In such a case, the peer device 103 could periodically monitor the memory location where the current data notifier is stored in order to determine the progress of the block transfer. If the peer device 103 reads the data notifier value 450 associated with the tenth memory read request message 400, then the peer device knows that the first ten memory read requests completed. If the peer device 103 reads the data notifier value 450 associated with the twentieth memory read request message 400, then the peer device knows that the first twenty memory read requests completed, and so on.

In various embodiments, the memory read request messages 400 may be of fixed length or variable length. In one example, the memory read request messages 400 could be of fixed length. In such a case, all fields in the memory read request message 400 would be present, whether or not the fields contain useful information. As such, the data notifier value 450 field is included in the memory read request message 400 even if the data notifier flag indicates that the memory read request does not include a data notifier value 450. In such a case, the data notifier value 450 would contain a dummy value. In another example, the memory read request messages 400 could be of variable length. As such, the memory read request message 400 would only include a data notifier value field 450 if the data notifier flag indicates that the memory read request includes a data notifier value 450. Otherwise, the data notifier value field 450 would not be included in the memory read request message 400. Correspondingly, performance could be improved where unneeded parameters fields are not transmitted with the memory read request message 400.

It will be appreciated that the architecture described herein is illustrative only and that variations and modifications are possible. For example, although the techniques described herein are within the context of a CPU as a peer device 103, initiating a read request to a GPU as a peer device 105, the peer devices 103 and 105 could be any computing device, including, without limitation, CPUs, GPUs, and other processing units, in any combination. In another example, the read completion mailbox 140 and circular read buffers 300 associated with various CPUs and GPUs could be located in adjacent regions of memory on the same page or set of pages managed by the MMU 167. In such a case, the CPU and GPU mailbox systems could share memory page parameters. Alternatively, the read completion mailbox 140 and circular read buffers 300 associated with various CPUs could be separated from the read completion mailbox 140 and circular read buffers 300 associated with the various GPUs. In such a case, the CPU mailbox systems be located on a different memory page from the GPU mailbox systems, and accordingly have different MMU parameters.

Figure 5A:
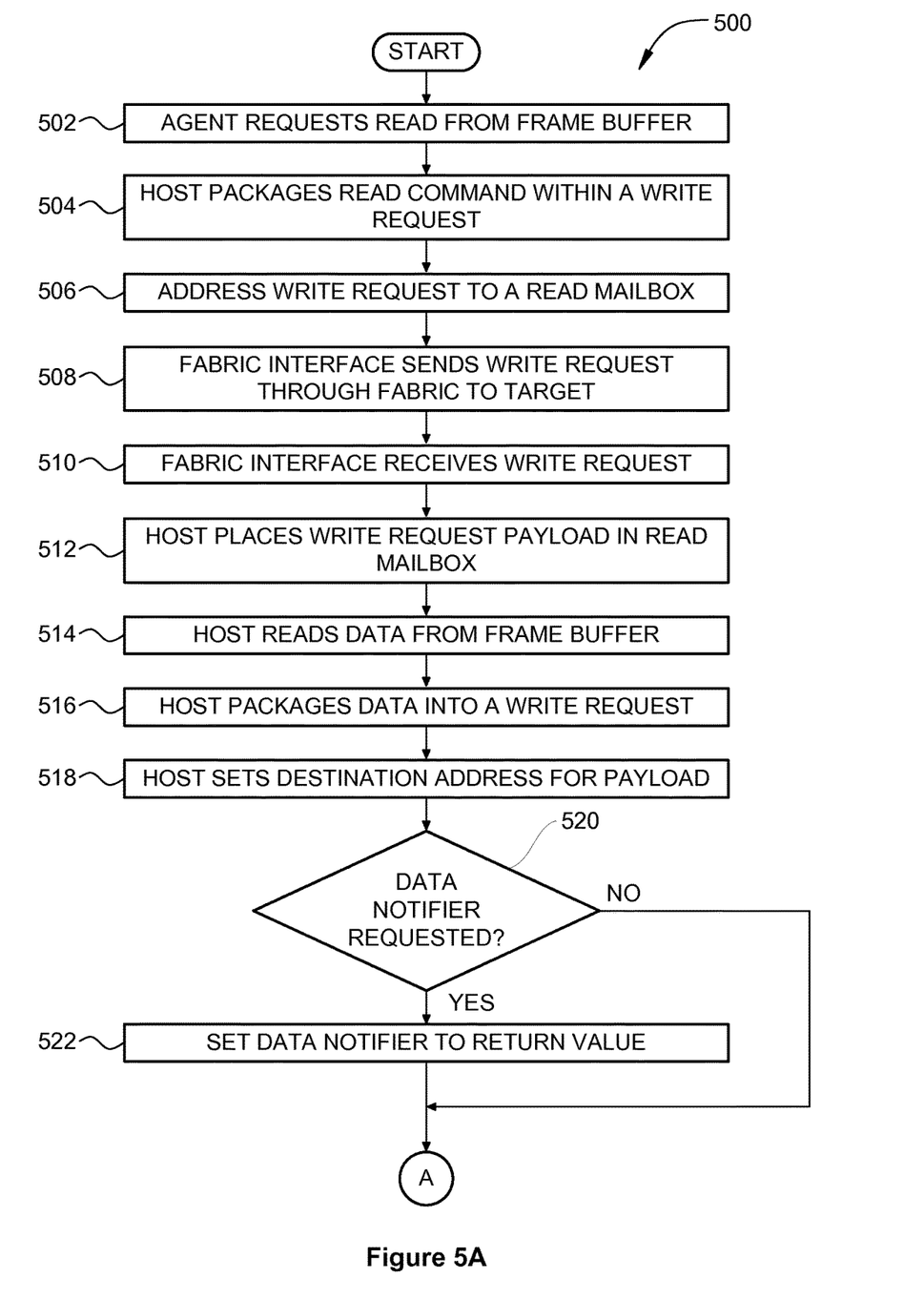
FIGS. 5A and 5B set forth a flow diagram of method steps depicting a read process including one or more read request messages, according to one embodiment of the present invention.
Figure 5B:
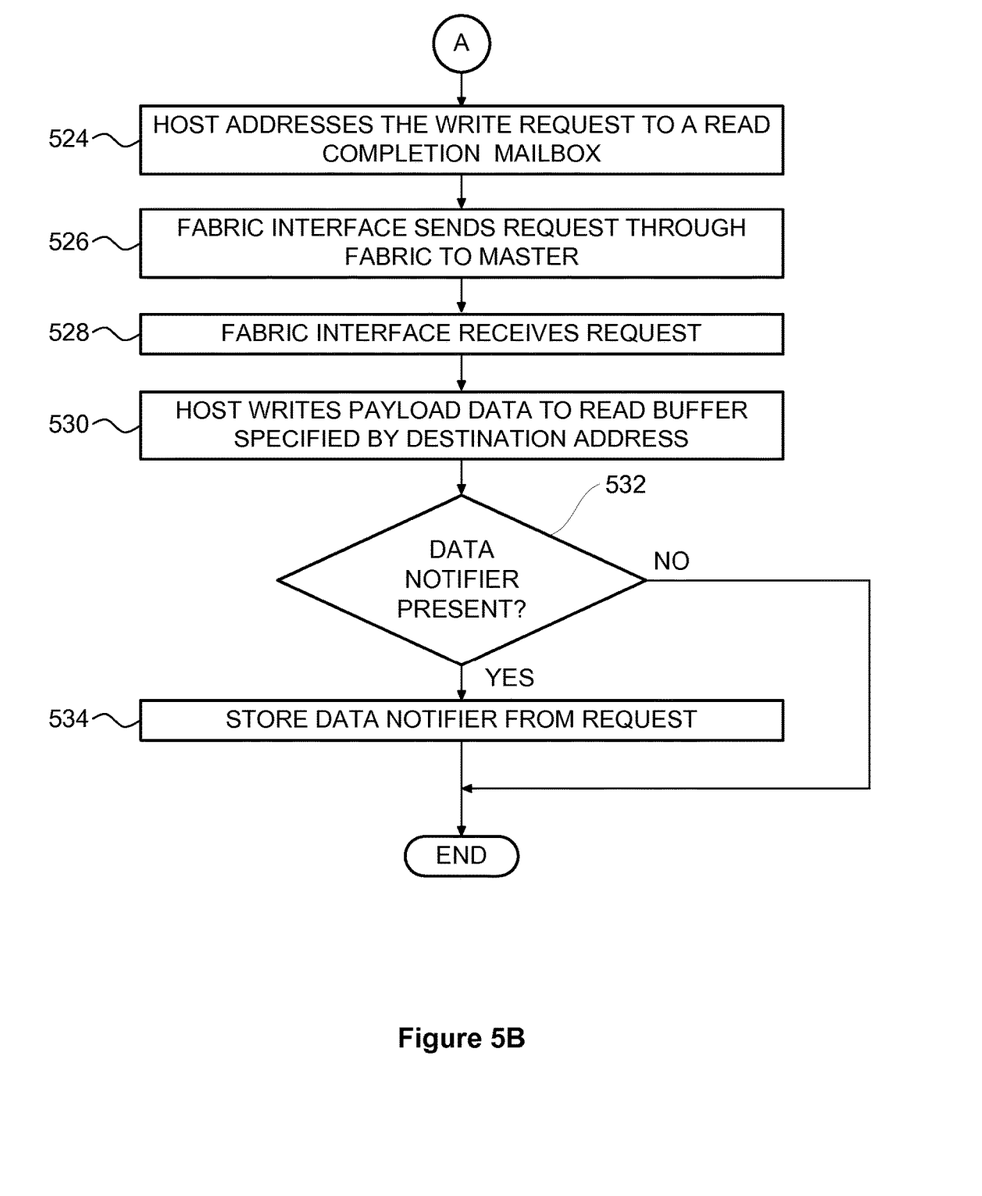

FIGS. 5A and 5B set forth a flow diagram of method steps depicting a read process including one or more read request messages, according to one embodiment of the present invention. Although the method steps are described in conjunction with FIGS. 1-4, persons skilled in the art will understand that any system configured to perform the method steps, in any order, falls within the scope of the present invention. To facilitate understanding of the invention, the peer device 103 that is requesting to read data is identified hereinafter as the "master device," while the peer device 105 that contains the information to be read is identified as the "target device."

The method 500 begins at step 502, where the agent 168 in accordance with instructions from the client 112, requests to read data from the target frame buffer 118. At step 504, the host logic 134 within the master device 103 packages the read command from the client 112 with the address and data type into a read request packet that is written to the peer (i.e., the target device 105). Such packaging is performed because the fabric 104 may not enable read request operations. However, the fabric 104 understands and communicates such a write request. Therefore, the host logic 134 packages the read command information including a command field, a physical address identifying where the data is located within the peer frame buffer 118, the size of the requested data, and the data type of that data (e.g., an identifier for the format used to encode the stored data). In one embodiment, the host logic 134 may determine through the memory management unit 167, the physical address of the data, the size of the data and the data type of the data from the page table 136. This read command information is placed in the payload section of the write request. A person skilled in the art will recognize, sending the physical address to the target device 105 permits the read command to be processed by target device 105 without any address translation.

At step 506, the host logic 134 addresses the write request (including the read request packet) to a read mailbox 160 within the target device 105. In one embodiment, this read mailbox address is provided by the resource manager 164. At step 508, the fabric interface 166 sends the request through the fabric 104 to the target peer device 105. At step 510, the fabric interface 174 receives the write request. At step 512, the payload is extracted from the read request packet, thereby converting the write request containing the read request packet into a read command. The host logic 172 places the read command into the read mailbox 160, a first in first out (FIFO) buffer having a depth that is commensurate with the maximum number of transactions that the master device 103 is allowed to have outstanding. As such, this FIFO (or queue) holds each read command until it is processed by the target device 105. At step 514, the host logic 172 removes the read command from the read mailbox 160 and reads the data from the frame buffer 118 in accordance with the read command and data type. At step 516, the host logic 172 packages the retrieved data into a completion packet, transmitted as a write request packet that is consistent with the protocol supported by the fabric 104.

At step 518, the host logic 172 sets the destination address for the payload data according to the value of the circular read buffer address 430 in the corresponding memory read request message 400. At step 520, the host logic 172 determines whether a data notifier is requested. For example, the host logic 172 could test the data notifier flag 440 in the corresponding memory read request message 400 to determine whether a data notifier is requested for the read command. If a data notifier is requested, then the method 500 proceeds to step 522, where the host logic 172 sets the data notifier value to the return value as specified in the data notifier 450 field of the corresponding memory read request message 400. The method then proceeds to step 524. If, at step 520, a data notifier is not requested, then the method 500 proceeds directly to step 524, where the host logic 172 addresses the write request to the read completion mailbox 140 within the master device 103. At step 526, the fabric interface 174 sends the write request through the fabric 104 to the requester, i.e., the client 112, via the master device 103.

At step 528, the fabric interface 166 receives the write request. At step 530, the host logic 134 within the master device 103 writes the payload data from the write request to the read buffer as specified by the destination address in the write request. At step 532, the host logic 134 determines whether a data notifier is present in the write request. If a data notifier is present, then the method 500 proceeds to step 534, where the host logic 134 stores the data notifier value from the write request in a memory location designated for the current data notifier value. The method 500 then terminates.

If, at step 532, a data notifier is not present, then the method 500 terminates.

In some embodiments, multiple instances of the method 500 may be in process simultaneously, where each instance of the method 500 is associated with a different read command. Multiple read commands may be associated with a single memory read request from the agent 168. In such a case, each of the multiple read commands may be assigned to deliver payload data to a group of consecutive read buffers 320 in the circular read buffer 300. When all of the multiple read commands complete, the agent 168 may access the read data received from the target frame buffer 118.

In some embodiments, tracking logic underlying the read completion mailbox 140 is used to track outstanding read requests and to match those outstanding requests with the read completion packets returned from the target device 105. The tracking logic may specifically store client information in order to return read data to the appropriate client 112. In some embodiments of the present invention, the read completion mailbox 140 includes storage resources, e.g., registers, RAM, or the like, that are reserved as needed by the tracking logic for storing retrieved data prior to transferring it to the client 112. In one embodiment, in the host logic 134, a tag is generated when the read command is issued and that tag is matched against the read completion tag that is received with data written into the read completion mailbox 140. Since many clients 112 may be making read requests through the agent 168 to the various frame buffers within the computing environment 100, it is important to track the issuance and completion of read requests to avoid possible errors.

As described above, the present invention enables a peer-to-peer read transaction to be performed even though the interconnection fabric 104 may not support a read transaction. As such, read transactions can be performed without modifying the standard communication protocol used by the fabric or supported in the specific implementation of the fabric.

In sum, payload data larger than the size of a peer-to-peer memory buffer are efficiently transferred between a CPU and a GPU over an interconnectivity fabric. Specifically, a CPU client transfers a read request message to a GPU device via a mailbox mechanism, where the read request message specifies the starting location of a read buffer where the returned read data is written. The CPU creates multiple read requests, each of which includes a sub-block of data to be written to a sub-block within the read buffer on the CPU. The sub-block address is auto-incremented to prevent over-write of the read data buffer by the multiple read requests. If a data notifier request is present within a given read request, the correspond read completion writes a data notifier location with a corresponding tag, indicated that the given read request completed. The CPU may detect when the read buffer is full, such that an additional read request is written to the start of the read buffer, and thus may overwrite the previous data.

One advantage of the disclosed technique is that an arbitrary number of multiple read operations may be in progress at a given time without using multiple peer-to-peer memory buffers. Performance for large data block transfers is improved without consuming peer-to-peer memory buffers needed by other peer GPUs.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. Therefore, the scope of embodiments of the present invention is set forth in the claims that follow.

What is claimed is:

1. A method for performing peer-to-peer data transfers comprising:
   receiving, at a source device, a single request to read a plurality of data words from a target device;
   in response to receiving the single request:
      creating a first read command for reading a first portion of the plurality of data words from the target device; and
      creating a second read command for reading a second portion of the plurality of data words from the target device;
   transmitting, at the source device, the first read command to the target device; and
   before a first read operation associated with the first read command is complete, transmitting, at the source device, the second read command to the target device, the second read command associated with a second read operation,
   wherein the first portion of the plurality of data words accessed via the first read operation is stored in a first portion of a buffer memory, and wherein the second portion of the plurality of data words accessed via the second read operation is stored in a second portion of the buffer memory.

2. The method of claim 1, wherein the first read command and the second read command are transmitted to the target device via an interconnectivity fabric.

3. The method of claim 1, wherein creating the first read command comprises:
   inserting into the first read command a first memory address that is associated with the first portion of the buffer memory wherein the first portion of the plurality of data words is written.

4. The method of claim 3, wherein creating the second read command comprises:
   inserting into the second read command a second memory address that is associated with the second portion of the buffer memory wherein the second portion of the plurality of data words is written.

5. The method of claim 4, wherein both the first memory address and the second memory address are associated with a pointer that is updated from the first memory address to the second memory address after the first read operation associated with the first read command is complete.

6. The method of claim 5, wherein the first portion of the plurality of data words is stored in the first portion of the buffer memory before the second portion of the plurality of data words is stored in the second portion of the buffer memory.

7. The method of claim 1, wherein the first portion of the plurality of data words is stored in the first portion of the buffer memory before the second portion of the plurality of data words is stored in the second portion of the buffer memory.

8. The method of claim 1, wherein creating the first read command comprises:
   inserting into the first read command, a data notifier value that is stored by the target device in a memory after the target device returns the first portion of the plurality of data words.

9. A subsystem comprising:
   a source device configured to perform peer-to-peer data transfers by performing the steps of:
      receiving a single request to read a plurality of data words from a target device;
      in response to receiving the single request:
         creating a first read command for reading a first portion of the plurality of data words from the target device; and
         creating a second read command for reading a second portion of the plurality of data words from the target device;
      transmitting the first read command to the target device; and
      before a first read operation associated with the first read command is complete, transmitting the second read command to the target device, the second read command associated with a second read operation,
      wherein the first portion of the plurality of data words accessed via the first read operation is stored in a first portion of a buffer memory, and wherein the second portion of the plurality of data words accessed via the second read operation is stored in a second portion of the buffer memory.

10. The subsystem of claim 9, wherein the first read command and the second read command are transmitted to the target device via an interconnectivity fabric.

11. The subsystem of claim 10, wherein the interconnectivity fabric comprises a bridge device that supports advanced microcontroller bus architecture (AMBA), accelerated graphics port (AGP), peripheral controller interface (PCI) bus, or PCI-Express™ (PCIe) bus protocols.

12. The subsystem of claim 9, wherein creating the first read command comprises:
inserting into the first read command a first memory address that is associated with the first portion of the buffer memory wherein the first portion of the plurality of data words is written.

13. The subsystem of claim 12, wherein creating the second read command comprises:
inserting into the second read command a second memory address that is associated with the second portion of the buffer memory wherein the second portion of the plurality of data words is written.

14. The subsystem of claim 13, wherein both the first memory address and the second memory address are associated with a pointer that is updated from the first memory address to the second memory address after the first read operation associated with the first read command is complete.

15. The subsystem of claim 14, wherein the first portion of the plurality of data words is stored in the first portion of the buffer memory before the second portion of the plurality of data words is stored in the second portion of the buffer memory.

16. The subsystem of claim 9, wherein the first portion of the plurality of data words is stored in the first portion of the buffer memory before the second portion of the plurality of data words is stored in the second portion of the buffer memory.

17. The subsystem of claim 9, wherein creating the first read command comprises:
inserting into the first read command, a data notifier value that is stored by the target device in a memory after the target device returns the first portion of the plurality of data words.

18. The subsystem of claim 9, wherein the buffer memory is a circular buffer.

19. The subsystem of claim 9, wherein the first device and the second device are included within a system on a chip (SoC) implementation.

20. A system for performing peer-to-peer data transfers comprising:
a source device;
a target device;
a memory coupled to the source device, wherein the memory includes an application program that includes instructions that, when executed by the source device, cause the source device to perform the steps of:
receiving a single request to read a plurality of data words from the target device;
in response to receiving the single request:
creating a first read command for reading a first portion of the plurality of data words from the target device; and
creating a second read command for reading a second portion of the plurality of data words from the target device;
transmitting the first read command to the target device; and
before a first read operation associated with the first read command is complete, transmitting the second read command to the target device, the second read command associated with a second read operation,
wherein the first portion of the plurality of data words accessed via the first read operation is stored in a first portion of a buffer memory, and wherein the second portion of the plurality of data words accessed via the second read operation is stored in a second portion of the buffer memory.

21. The method of claim 1, wherein the first portion and the second portion comprise contiguous portions in the buffer memory.

* * * * *